US010829011B2

United States Patent
Campbell et al.

(10) Patent No.: US 10,829,011 B2
(45) Date of Patent: Nov. 10, 2020

(54) APPARATUS AND METHOD FOR A BOOSTER SEAT ANCHOR BELT RETRACTOR SYSTEM

(71) Applicant: GRACO CHILDREN'S PRODUCTS, INC., Atlanta, GA (US)

(72) Inventors: Laurence Campbell, Atlanta, GA (US); Andrew Phillip Kitchens, Kennesaw, GA (US)

(73) Assignee: GRACO CHILDREN'S PRODUCTS, INC., Atlanta, GA (US)

( * ) Notice: Subject to any disclaimer, the term of this patent is extended or adjusted under 35 U.S.C. 154(b) by 31 days.

(21) Appl. No.: 16/011,971

(22) Filed: Jun. 19, 2018

(65) Prior Publication Data
US 2018/0361888 A1  Dec. 20, 2018

Related U.S. Application Data

(60) Provisional application No. 62/522,544, filed on Jun. 20, 2017.

(51) Int. Cl.
*B60N 2/28* (2006.01)
*B60R 22/34* (2006.01)
*A47D 1/10* (2006.01)

(52) U.S. Cl.
CPC .......... *B60N 2/2866* (2013.01); *A47D 1/103* (2013.01); *B60N 2/2887* (2013.01);
(Continued)

(58) Field of Classification Search
CPC .... B60N 2/2866; B60N 2/2887; B60N 2/289; B60N 2/2893; A47D 1/103
See application file for complete search history.

(56) References Cited

U.S. PATENT DOCUMENTS 5,383,708 A * 1/1995 Nagasaka ............ B60N 2/2806
297/250.1
5,560,565 A  10/1996 Merrick et al.
(Continued)

FOREIGN PATENT DOCUMENTS

EP    2540564 A1 * 1/2013 ........... B60N 2/2866
WO    2017/109723 A1   6/2017

OTHER PUBLICATIONS

Affix, Youth Booster Seat with Latch System, 4 pages, http://www.gracobaby.com/en-US/affix-youth-booster-seat-with-latch-system-103505.
(Continued)

*Primary Examiner* — David R Dunn
*Assistant Examiner* — Tania Abraham
(74) *Attorney, Agent, or Firm* — Eversheds Sutherland (US) LLP

(57) ABSTRACT

An anchor belt retractor system can be provided with a booster seat. The booster seat can include a booster seat base and optionally a seat back. The booster seat base can include a cavity or housing within which the anchor belt retractor system is housed. The anchor belt retractor system can include at least one spool or drum about which webbing can be wound. The system can also include a first anchor webbing having a first end coupled to the spool and a second end coupled to an anchor latch. The system can also include a second anchor webbing having a first end coupled to the spool and a second end coupled to a second anchor latch. The spool or drum can be spring-biased to take up any slack in the first and second anchor webbings.

19 Claims, 6 Drawing Sheets

(52) U.S. Cl.
CPC ............... *B60N 2002/2815* (2013.01); *B60N 2002/2818* (2013.01); *B60R 22/34* (2013.01)

(56) References Cited

U.S. PATENT DOCUMENTS

| | | | |
|---|---|---|---|
| 5,779,319 A | 7/1998 | Merrick | |
| 6,832,813 B2* | 12/2004 | Tomas | A47D 1/002 297/250.1 |
| 7,159,948 B1 | 1/2007 | Wolf | |
| 7,350,767 B2 | 4/2008 | Huang | |
| 8,141,950 B2 | 3/2012 | Boyer | |
| 8,256,840 B2* | 9/2012 | Dasent | B60N 2/2806 297/253 |
| 8,328,281 B2 | 12/2012 | Balensiefer, II et al. | |
| 8,444,222 B2 | 5/2013 | Buckinghan et al. | |
| 8,833,854 B2* | 9/2014 | Lu | A47D 1/103 297/253 |
| 8,967,715 B2* | 3/2015 | Carpenter | B60N 2/2821 297/253 |
| 9,688,167 B2* | 6/2017 | Hutchinson | B60N 2/2806 |
| 2006/0082129 A1 | 4/2006 | Dingman et al. | |
| 2010/0033001 A1 | 2/2010 | Boyer | |
| 2013/0106157 A1* | 5/2013 | Cheng | B60N 2/26 297/250.1 |
| 2017/0079446 A1* | 3/2017 | Bellows | A47C 1/02 |

OTHER PUBLICATIONS

Cambria Booster, Three things you'll love about your new booster seat, 21 pages, https://us.diono.com/product/cambria-booster/.
Chico, KidFit Zip 2-in-1 Belt Positioning Booster Car Seat—Spectrum, 5 pages, https://www.chiccousa.com/gear/car-seats/booster-seats/kidfit-zip-2-in-1-belt-positioning-booster-car-seat---spectrum/06079485000070.html.

* cited by examiner

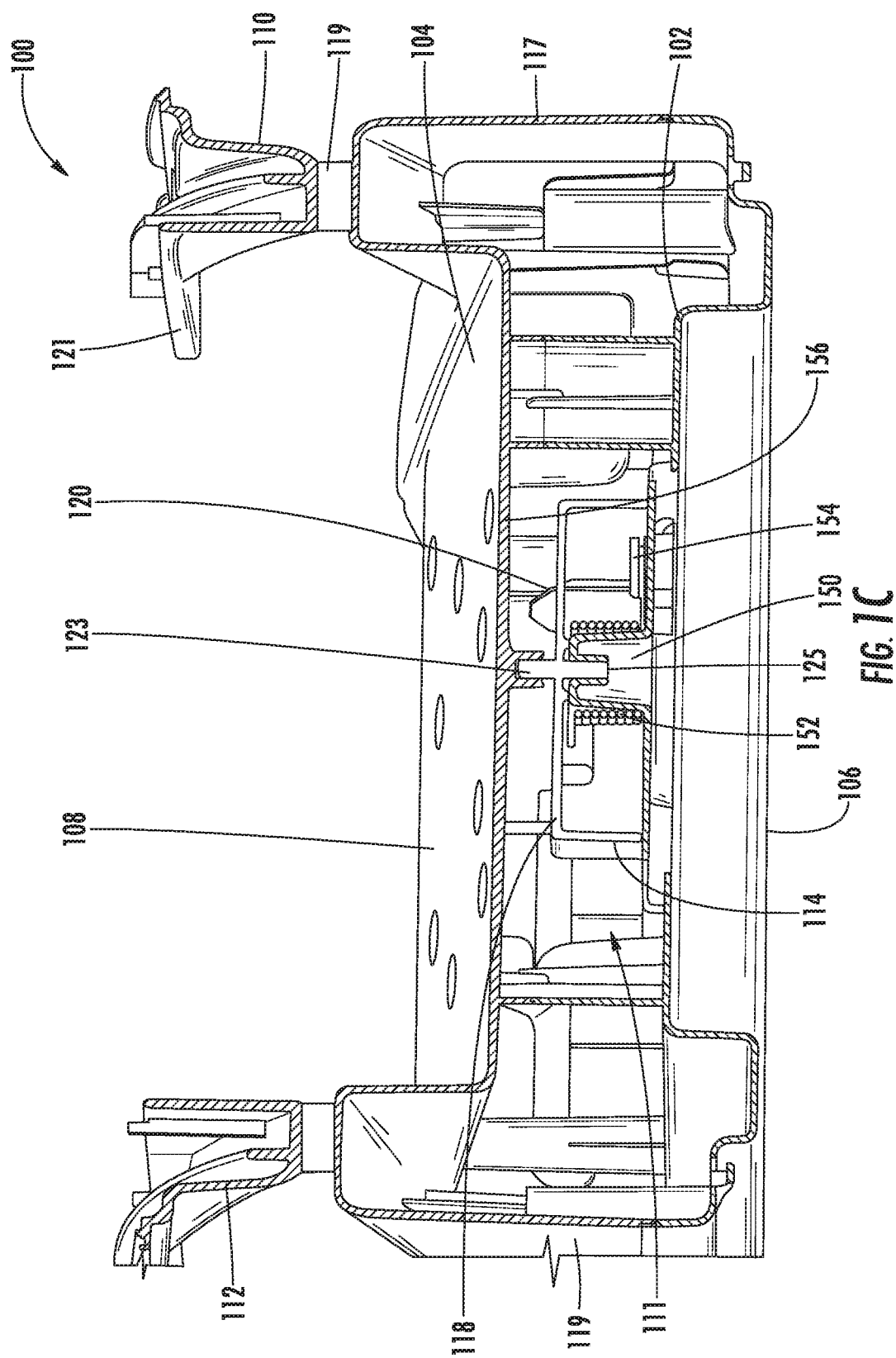

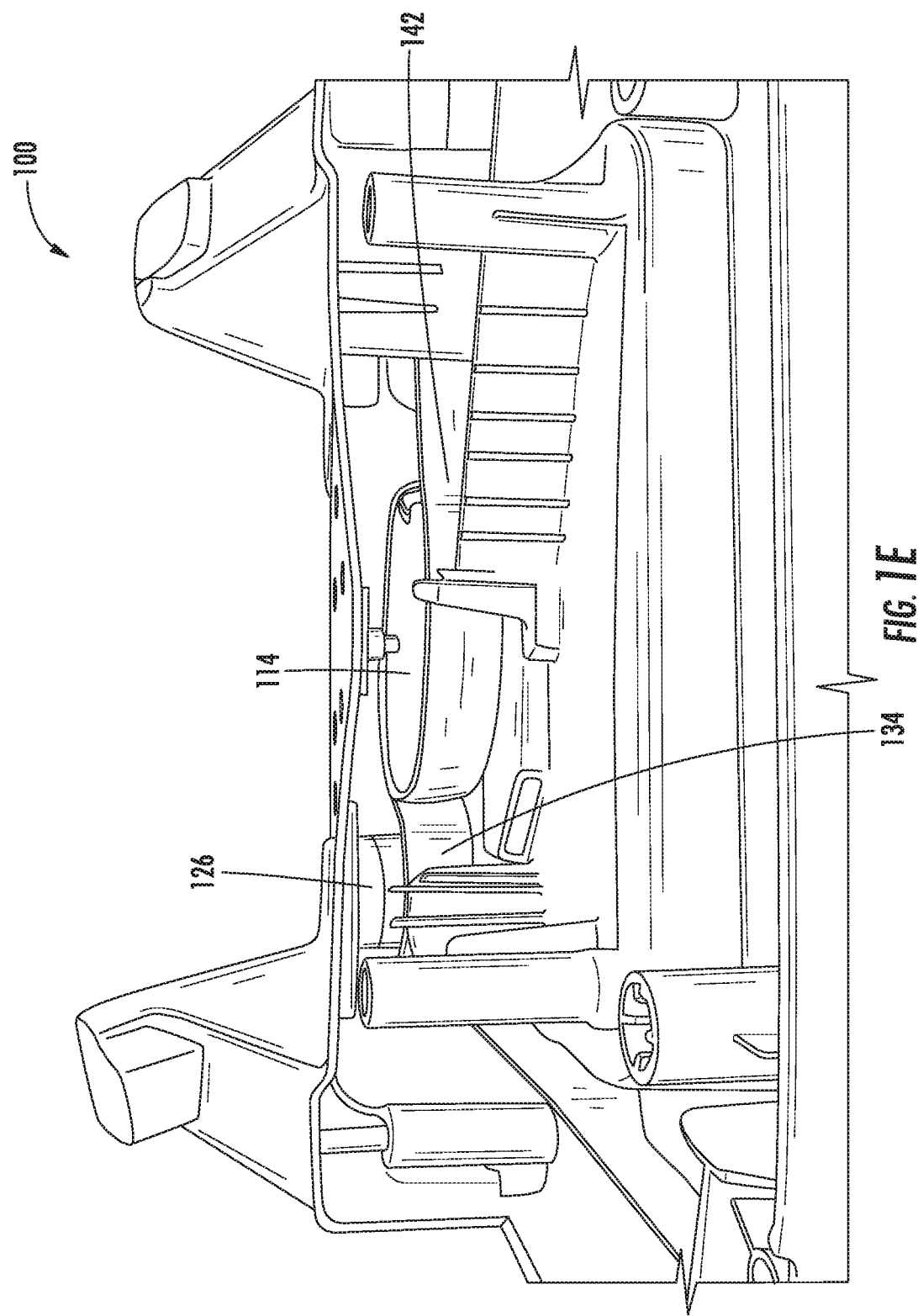

APPARATUS AND METHOD FOR A BOOSTER SEAT ANCHOR BELT RETRACTOR SYSTEM

RELATED APPLICATIONS

This application claims priority under 35 U.S.C. § 119 to U.S. Provisional Patent Application No. 62/522,544 filed Jun. 20, 2017, and titled "Apparatus and Method for a Booster Seat Anchor Belt Retractor System," the entire contents of which are hereby incorporated herein by reference for all purposes.

TECHNICAL FIELD

Embodiments disclosed herein are generally related to children's booster seats, and more particularly to apparatuses and methods for providing a booster seat with an anchor belt retractor system.

BACKGROUND

Children's vehicle booster seats (hereinafter "booster seat") are well known in the art. The booster seat is configured for the child to sit on the booster seat such that the position of the child is raised in the vehicle. Commonly, booster seats have a seat base. Some conventional booster seats also include a seat back. The typical booster seat rests on top of the vehicle seat but the vehicle's safety harness (e.g., seatbelt) is used to secure the seat occupant (e.g., a child) in the booster seat as well as the seat the booster seat sits on. The seat back on some booster seats is removable, converting the seat to a seat base-only booster for larger children. The booster seat not only more closely fits the child's smaller body size, but also elevates the child to aide in properly positioning the child with respect to the seatbelt.

Booster seats are often moved from car to car or used in different vehicles. Some conventional booster seats can include additional belts or webbing (hereinafter referred to as "webbing") to secure the booster seat to the vehicle. In some conventional booster seats, the webbing includes an anchor clip at one end for securing the webbing to an anchor (which is typically positioned between the seat base and the seat back of the vehicle) of the vehicle. The other end of the webbing can be coupled to the booster seat. Once coupled to the anchor, the webbing can be tightened by the user by adjusting the webbing length using a belt tightening adjuster. However, this procedure requires the user to remember to subsequently tighten the webbing after the anchor clip is secured to the anchor, which does not always occur. Further, once the user desires to move the booster seat, the user must further adjust the belt tightening adjuster to loosen the webbing, by increasing the length of the webbing, in order to remove the anchor clip from the vehicle anchor.

BRIEF DESCRIPTION OF THE SEVERAL VIEWS OF THE DRAWINGS

For a more complete understanding of the present disclosure and certain features thereof, reference is now made to the following description, in conjunction with the accompanying figures briefly described as follows:

FIG. 1C is a partial rear cross-sectional view of the booster seat base showing the top panel, bottom panel, and cavity provided between the top and bottom panels, in accordance with one example embodiment of the disclosure.

FIG. 1E is a partial front cross-sectional view of the booster seat base, in accordance with one example embodiment of the disclosure.

DETAILED DESCRIPTION OF THE EXAMPLE EMBODIMENTS

Figure 1A:
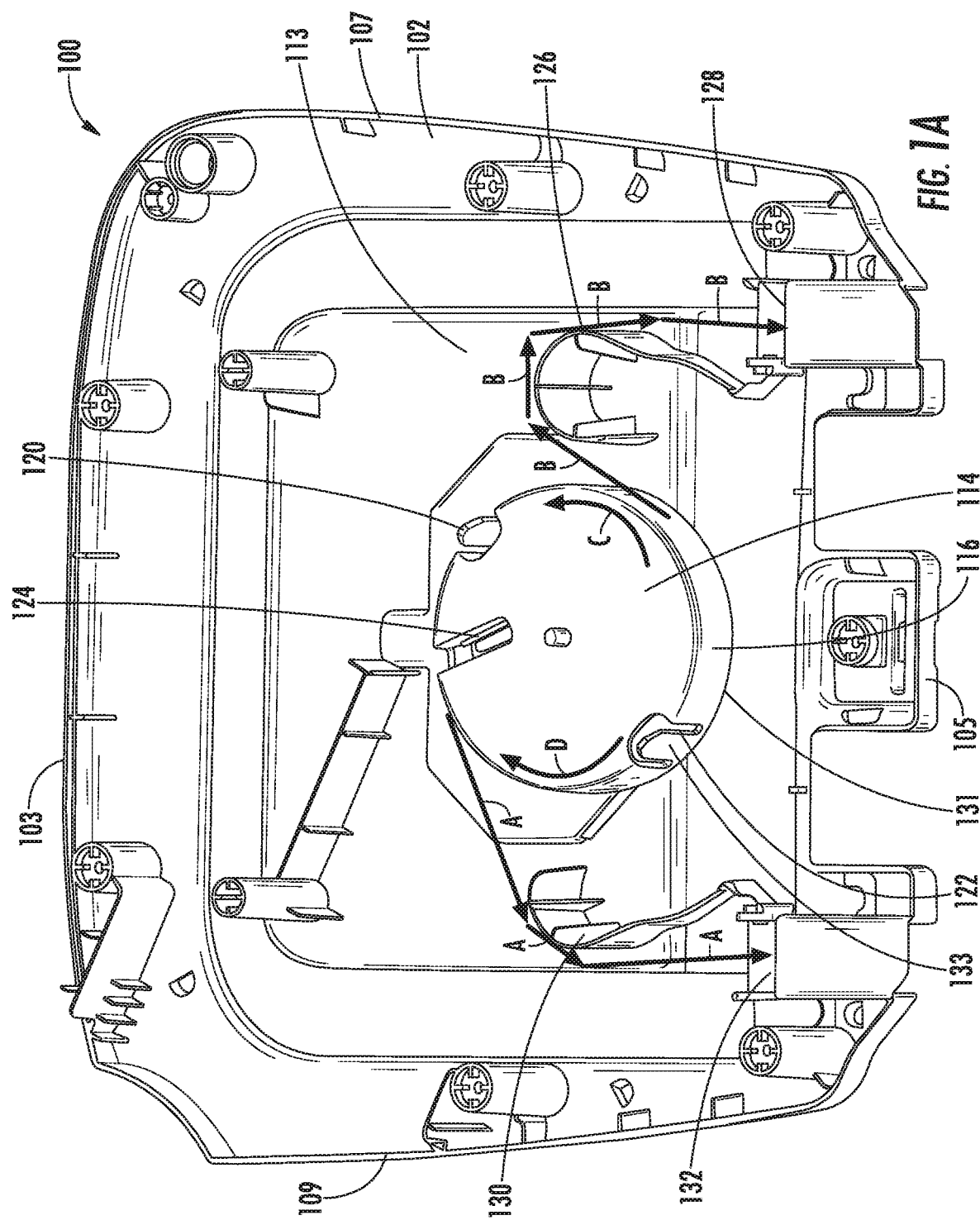
FIG. 1A presents a top perspective view of a bottom panel of a booster seat base, in accordance with one example embodiment of the disclosure.

Example embodiments of the invention now will be described more fully hereinafter with reference to the accompanying drawings, in which example embodiments are shown. This invention may, however, be embodied in many different forms and should not be construed as limited to the exemplary embodiments set forth herein; rather, these embodiments are provided so that this disclosure will be thorough and complete, and will fully convey the scope of the invention to those skilled in the art. Like numbers refer to like, but not necessarily the same, elements throughout.

Certain dimensions and features of the example booster seat are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the booster seat are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom. As used herein, the term "substantially orthogonal" indicates that the perpendicular relationship is not a strict relationship and does not exclude functionally similar variations therefrom.

The example booster seat can include one or more anchor webbings or belts that are attached along one end to a spool positioned within a cavity of the booster seat base below the seat surface upon which a child sits. The other end of the anchor webbings can include an anchor latch configured to be removably coupled to and decoupled from a vehicle anchor. The spool can be fixed to the booster seat base so that it does not move side-to-side or forward-and-backward within the booster seat base. The spool can be rotatable with respect to the booster seat base and can be spring-biased to retract or reel in each of the one or more anchor webbings to maintain a tension on the anchor webbings. As such, the spool can also be referred to as an automatically retracting web spool. While the spool is spring-biased to reel up any excess anchor webbing to maintain a tension on the anchor webbing once it has been coupled to the vehicle anchor(s), the spool does not include a locking mechanism to lock the anchor webbings in place once they have coupled to the vehicle anchor(s) or when a sudden force is applied to the booster seat base. This is because, unlike an infant car seat, it is the vehicle's safety belts that are intended to maintain the child in a proper position during an accident when they are on the booster seat base and not the anchor webbings. Further, the spool does not include a locking or release mechanism to unlock or allow the webbing to be unwound from the spool. Instead, a user only needs to apply a force on the booster seat base that is greater than the spring-biasing force on the spool to pull the booster seat base away from the vehicle seat and the webbing will unwind from the spool. These and other features will be described below with reference to the figures.

FIGS. 1A-1E are various views of a child's booster seat base 100, in accordance with one example embodiment of the disclosure. Referring now to FIGS. 1A-1E, the example booster seat base 100 can include a bottom panel 102 and a top panel 104. The bottom panel 102 can be removably or fixedly coupled to the top panel 104. For example, each of the bottom panel 102 and top panel 104 can include one or more alignment pins and/or alignment sleeves that can be received in corresponding alignment pins and/or alignment sleeves in the other of the bottom panel 102 and the top panel 104 to align and slidably couple the bottom panel 102 to the top panel 104. Alternatively, other methods of coupling the bottom panel 102 to the top panel 104 may be used, including a combination of screws and apertures, a combination of tabs and slots, rivets, adhesives, any combination thereof, and/or any other coupling devices and methodologies known to those of ordinary skill in the art.

When coupled, the bottom panel 102 and the top panel 104 define an interior cavity 111 or open space therebetween with the bottom panel 102 and the top panel 104 collectively creating a housing, as best viewed in FIG. 1C. In certain example embodiments, all or at least portions of each of the bottom panel 102 and the top panel 104 can be constructed of plastic. In other examples, metal, soft goods, or other materials may be used instead of or in addition to plastic for constructing the bottom panel 102 and the top panel 104.

The bottom panel 102 can include a front end 103, a back side 105, an opposing lateral sides 107, 109. The back side 105 can be configured to be placed adjacent to a vehicle seat back when the child booster seat base 100 is placed within a vehicle. The bottom panel 102 can also include a bottom surface 106 and an interior or opposing top surface 113 opposite the bottom surface 106. The bottom surface 106 can be configured to rest upon the top surface of a vehicle seat when the child booster seat base 100 is installed in a vehicle. In certain example embodiments, the bottom surface 106 can be flat or substantially flat.

The bottom panel 102 can also include a first web passageway 128 positioned generally along the back side 105 of the bottom panel 102 and positioned adjacent one lateral side 107 of the bottom panel 102. The bottom panel 102 can also include a second web passageway 132 positioned generally along the back side 105 of the bottom panel 102 and positioned adjacent another lateral side 109 of the bottom panel 102 opposite the first web passageway 128. Each web passageway 128, 132 can be an aperture in the bottom panel 102 or a space, cut-out, or opening left between the bottom panel 102 and the top panel 104 along the rear or back side of the booster seat base 100. Each web passageway 128, 132 can provide or define, alone or with corresponding web passageways on the top panel 104 a passageway, channel or opening from the exterior of the rear or back side of the booster seat base 100 into the cavity 111 of the booster seat base 100 for the webbings to extend through.

The bottom panel 102 can also include a mounting post 150. The mounting post 150 can have a generally cylindrical, conical, or frusto-conical shape and can extend up from the interior or top surface 113 of the bottom panel 102. In one example, the mounting post 150 can be integrally formed with the interior surface 113. Alternatively, the mounting post 150 can be separately constructed and coupled to the interior surface 113. The mounting post 150 can be sized and shaped to have a spring 152 coupled to or disposed about at least a portion of the mounting post 150. In one example, the spring 150 is a torsion spring. However, in other example embodiments, the spring can alternatively be a compression spring or a tension spring.

The spring 150 can have a first end coupled to a raised spring catch 154 that extends up from the interior or top surface 113 of the bottom panel 102. In certain example embodiments, the raised spring catch 154 can include a first member having a bottom end coupled to (e.g., integrally formed with) the interior or top surface 113 and extending vertically or substantially vertically up from the interior or top surface 113 of the bottom panel 102 to a top end. The raised spring catch 154 can also include a second member extending horizontally or generally horizontally from the top end of the first member to create a generally L-shaped catch 154. The raised spring catch 154 is configured to receive and hold in place a first end of the spring 152 and provide a first rotational resistance point for the spring 152.

The top panel 104 can include a seat surface 108 and a top panel ceiling 156 provided generally opposite the seat surface 108. In one example, the top panel ceiling 156 is the opposing side of the seat surface 108. The seat surface 108 is configured for a child to sit thereon and can have a curved shape. In certain example embodiments, all or at least a portion of the seat surface 108 can include soft goods (not shown) including, but not limited to, padding, fabric, leather, faux leather and the like, that may be applied to the seat surface 108 to improve comfort for a person sitting on the seat surface booster seat base 100.

In certain example embodiments, the top panel 104 can also include a third web passageway positioned generally along the back side of the top panel 104 and positioned adjacent one lateral side of the top panel 104. The top panel 104 can also include a fourth web passageway positioned generally along the back side of the top panel 104 and positioned adjacent another lateral side of the top panel 104 opposite the third web passageway. The third and fourth web passageways can be an aperture in the top panel 104 or a space, cut-out, or opening left between the bottom panel 102 and the top panel 104 along the rear or back side of the booster seat base 100. Each of the third and fourth web passageways can provide or define, alone or with corresponding web passageways 128, 132 on the bottom panel 102 a passageway, channel or opening from the exterior of the rear or back side of the booster seat base 100 into the cavity 111 of the booster seat base 100 for the webbings to extend through.

The booster seat base 100 can also include a first armrest 110 extending up from the top panel 104 and/or bottom panel 102 along a first lateral side 117 of the booster seat base 100 and a second armrest 110 extending up from the top panel 104 and/or bottom panel 102 along a second lateral side 119 of the booster seat base 100 opposite the first lateral side 117. Each armrest 110, 112 can include a generally vertical member 119 having a first end and a distal second end. The first end of the generally vertical member 119 can be coupled to the top panel 104 and/or the bottom panel 102 and extend upward therefrom to the second distal end. Each armrest 110, 112 can also include a generally horizontal member 121 coupled to the distal second end of the vertical member 119 and configured to receive an arm of a child thereon. Each armrest 110, 112 can be fixedly or removably coupled to the booster seat base 100 (e.g., from the top panel 104 and/or the bottom panel 102). In addition, each armrest 110, 112 can include soft goods (not shown) including, but not limited to, padding, fabric, leather, faux leather and the like, applied to at least a portion of the armrests 110, 112 (e.g., along to top side of the generally horizontal member 121) to improve comfort.

Figure 2:
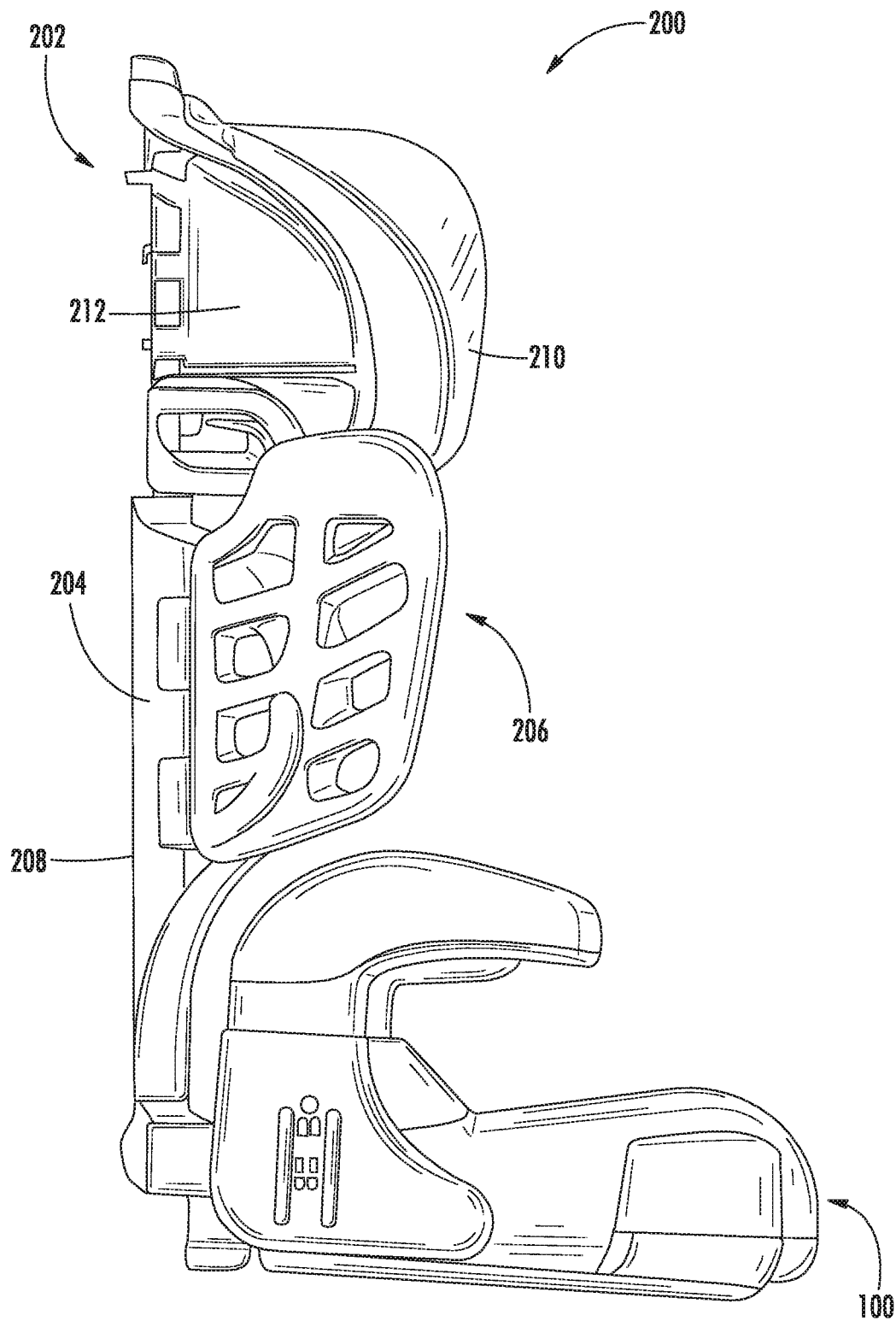
FIG. 2 is a side elevation view of a child safety seat, in accordance with one example embodiment of the disclosure.

As shown in FIG. 2, the booster seat or child safety seat can also include a seat back 202. In some example embodiments, the seat back 202 and booster seat base 100 may be formed as one unitary piece. In other example embodiments, the seat back 202 and booster seat base 100 may be formed from two or more separate pieces that are joined together during manufacturing. In other example embodiments, the seat back 202 and the booster seat base 100 are removably coupled to one another and provides the user with the ability to use the seat back 202 and booster seat base 100 together or to remove the seat back 202 from the booster seat base 100 and just use the booster seat base 100, without the seat back 202. Accordingly, the seat back 202 may be fixedly, removably, and/or rotatably coupled to the booster seat base 100.

The seat back 202 can include a backrest 204 that extends generally vertically upward with respect to the booster seat base 100 from the back side of the booster seat base 100. The backrest 204 can include a front side 206 and opposing back side 208. The front side 206 of the backrest 204 can be configured to receive a portion of a child's back thereon. All or a portion of the backrest 204 can include soft goods 210 (e.g., padding fabric, vinyl, plastic, leather, faux leather, etc.) to increase the comfort of the front side 206 of the backrest 204. In certain example embodiments, the seat back 202 may be adjustable to fit different sized occupants and different vehicles. In one example, the seat back 202 may include a vertically adjustable headrest 212 that may be slidably or otherwise vertically adjustably coupled to the backrest 204 to fit occupants of different heights. The headrest 212 can include a lever configured to decouple the headrest from the seat back 202 and allow the headrest 212 to be vertically adjusted up or down with respect to the backrest 204. Releasing the lever can then allow the headrest 212 to lock in one of multiple vertical positions along the backrest 204.

As best seen in FIGS. 1A and 1C, the bottom panel 102 can also include a spool or drum 114. The spool 114 can be rotatable with respect to the bottom panel 102 in the directions C and D. The spool 114 can include a mounting pin 123 that extends vertically or substantially vertically. In certain example embodiments, the mounting pin 123 is an elongated member coupled to and extending through a top panel 118 of the spool 114. The mounting pin 123 is insertable into an opening 125 along the top center of the mounting post 150 to allow the spool 114 to rotate with respect to (e.g., about or around) the mounting post 150. The mounting pin 123 can define an axis of rotation for the spool 114 in the directions C and D. However, as the mounting post 150 is fixedly coupled to or integrally formed with the bottom panel 102, the axis of rotation is fixed for the spool 114 and the spool 114 is not able to move or translate along the bottom panel 102 either forward and backward, side-to-side, or any combination thereof.

The spool 114 can include a top panel 118 and a side wall 116 extending down from the top panel 118 towards a bottom end of the side wall 116. The top panel 118 and the side wall 116 can be integrally formed together or separately formed and coupled together. In certain example embodiments, the top panel 118 is a planar or substantially planar member having a generally circular shape along its outer edge. The top panel 118 is disposed generally along a horizontal or substantially horizontal plane with the mounting pin 123 extending through the top panel 118 along a vertical or substantially vertical plane. The side wall 116 can extend downward from the outer edge of the top panel 118. In one example embodiment, the side wall 116 has an annular or substantially annual shape and has a generally smooth outer surface configured to receive the anchor webbings thereon and thereabout. In other embodiments, the side wall 116 can have any other shape to define the outer vertical surface of the spool 114. In addition, in certain example embodiments, the height of the side wall 116 is generally equal to or greater than the width of the anchor webbings.

Along the side wall 116, the spool 114 can also include at least one webbing mounting post. In certain embodiments, the side wall 116 of the spool 114 can include a first webbing mounting post 122 and a second webbing mounting post 120. In certain example embodiments, each webbing mounting post 120, 122 is formed from at least a portion of the side wall 116. In one example, the first webbing mounting post 120 and second webbing mounting post 122 can be integrally formed with the spool 114. Each webbing mounting post 120, 122 can extend vertically or substantially vertically up from a bottom end 131 of the side wall 116 and can extend up to the level of or above the top surface 118 of the spool 114. In one example, the first webbing mounting post 120 is diametrically opposed (e.g., 180 degrees offset) along the outer perimeter of the spool 114 from the second webbing mounting post 122. In other example embodiments, the first webbing mounting post 120 can be positioned anywhere within the range of substantially 1 degree to substantially 359 degrees offset from the second webbing mounting post 122 along the outer perimeter of the spool 114. In certain example embodiments, each webbing mounting post 120, 122 can have a conical, cylindrical, or planar shape and be configured to slidably receive a portion of one of the anchor webbings about the respective mounting post 120, 122. In one example, each of the webbing mounting posts 120, 122 can have a smooth outward facing surface 133, a first vertically extending side wall, a second vertically extending side wall, and an arcuate top end extending from the first vertically extending side wall to the second vertically extending side wall. The webbing can include a loop portion that can be slidably attached to one of the webbing mounting posts 120, 122 by moving the loop portion vertically downward on the post 120 or 122 until the loop is disposed about the post 120 or 122.

The spool 114 can also include a spring catch 124, as shown in FIG. 1A. In one example, the spring catch 124 can be an opening through the spool 114 for attaching the spring 152 thereto. The opening can be positioned through the top surface 118 and/or side wall 116 of the spool 114. Alternatively, the spring catch 124 can be one or more members extending generally inwardly from an inner surface of the side wall 116 or generally vertically downward from a bottom side of the top surface 118 of the spool 114. The spring catch 124 is configured to receive and hold in place or otherwise abut a second end of the spring 152 and provide a second rotational resistance point for the spring 152.

Figure 1B:
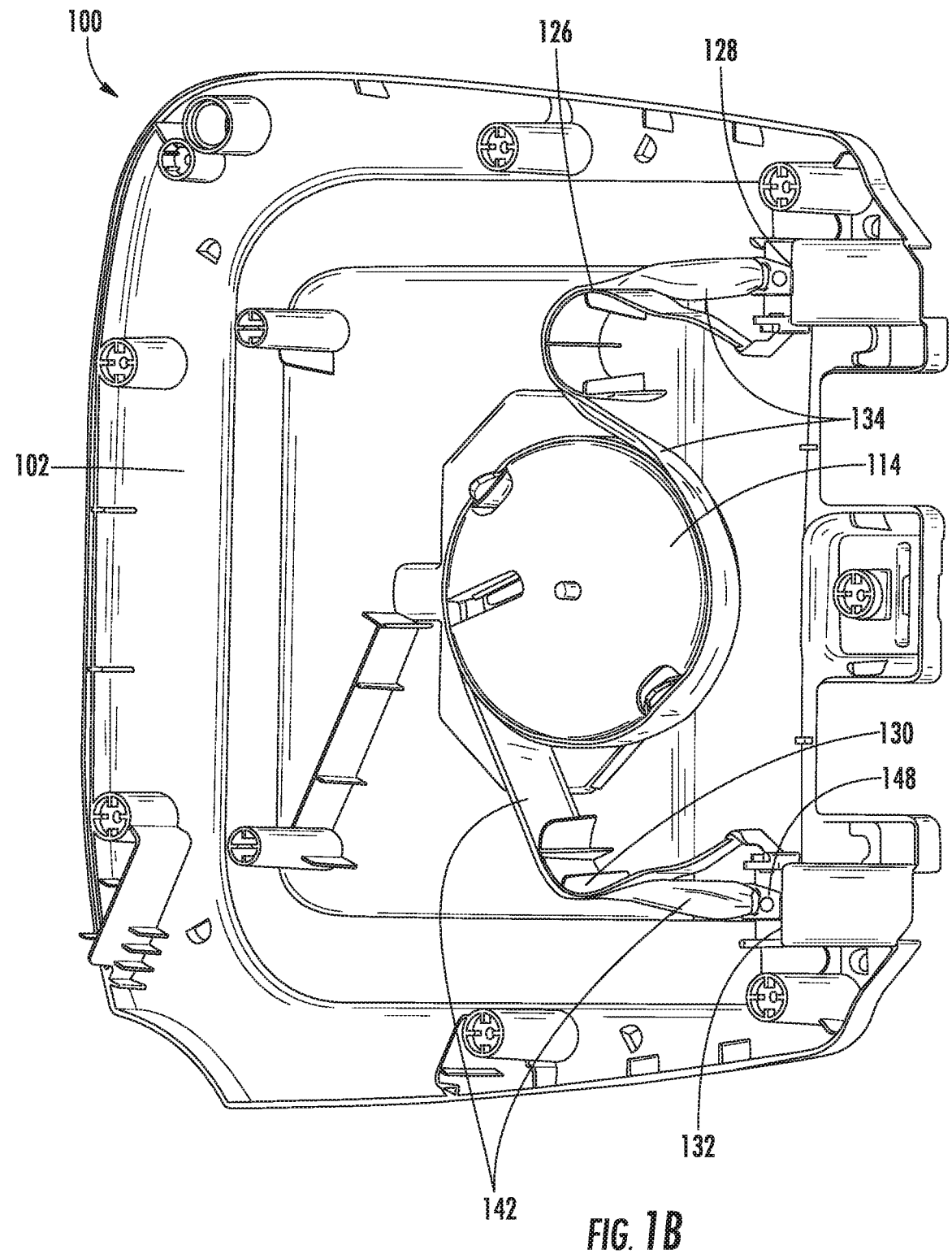
FIG. 1B is another top perspective view of the bottom panel of the booster seat base, in accordance with one example embodiment of the disclosure.
Figure 1D:
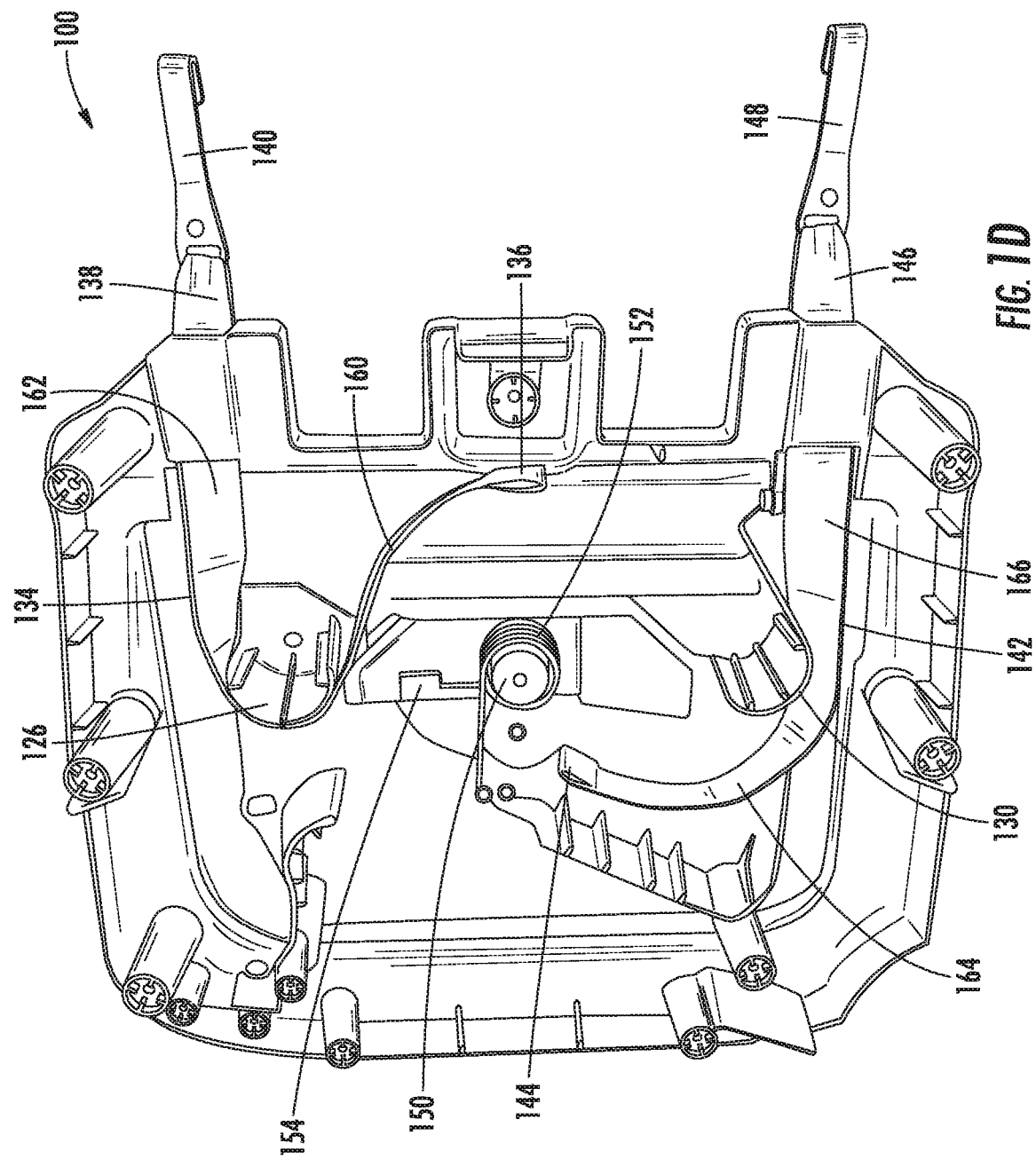
FIG. 1D is another top perspective view of the bottom panel of the booster seat base, in accordance with one example embodiment of the disclosure.

The bottom panel 102 can also include a first web guide 126. The first web guide 126 can extend up from the interior or top surface 113 of the bottom panel 102 and have a curved, curvilinear, or any other combination of curved and straight shapes to guide a first anchor webbing 134 (as shown in FIG. 1B) from the spool 114 to the web passageway 128 and out from the booster seat base 100 along the path B when the spool 114 rotates in the direction C and towards the booster seat base 100 through the web passageway 128 back onto the side wall 116 of the spool 114 along a path opposite the path B when the spool 114 rotates in the direction D. In one example, the first web guide 126 adjusts the direction of the first anchor webbing 134 in the range of substantially 90 to substantially 180 degrees and more preferably in the range of substantially 110 degrees to substantially 160 degrees. In addition, the first web guide 126 can rotate the first anchor webbing 134 from a horizontal or substantially horizontal orientation 162 at the web passageway 128 to a vertical or substantially vertical orientation 160 at the spool 114, as shown in FIG. 1D. As such, the first webguide 126 can rotate the first anchor webbing substantially 90 degrees between the web passageway 128 and the spool 114. The first web guide 126 can be integrally formed with the bottom panel 102 or separately constructed and coupled to the bottom panel 102.

The bottom panel 102 can also include a second web guide 130. The second web guide 130 can extend up from the interior or top surface 113 of the bottom panel 102 and have a curved, curvilinear or any other combination of curved and straight shapes to guide a second anchor webbing 142, as shown in FIG. 1B, from the spool 114 to the web passageway 132 and out from the booster seat base 100 along the path A when the spool 114 rotates in the direction C and towards the booster seat base 100 through the web passageway 132 and back onto the side wall 116 of the spool 114 along a path opposite the path A when the spool 114 rotates in the direction D. In one example, the second web guide 130 adjusts the direction of the second anchor webbing 142 in the range of substantially 45 to substantially 110 degrees and more preferably in the range of substantially 60 degrees to substantially 90 degrees. In addition, the second web guide 130 can rotate the second anchor webbing 142 from a horizontal or substantially horizontal orientation 166 at the web passageway 132 to a vertical or substantially vertical orientation 164 at the spool 114, as shown in FIG. 1D. As such, the second webguide 130 can rotate the second anchor webbing 142 substantially 90 degrees between the web passageway 132 and the spool 114. The second web guide 130 can be integrally formed with the bottom panel 102 or separately constructed and coupled to the bottom panel 102.

As best seen in FIGS. 1B and 1D, the first anchor webbing 134 can have a first end 136 and a distal second end 138. The first end 136 can include a means for attaching the first anchor webbing 134 to the first webbing mounting post 122 on the spool 114. In one example, the attachment means is a loop of the anchor webbing material provided at the first end 136 of the first anchor webbing 134 that can be slidably positioned onto the first web mounting post 122. The attachment means can alternatively include an eyelet, hollow tube, or adhesive coupled to or provided along the first end 136 of the first anchor webbing 134. The loop in the anchor webbing material can be created by adhering the first end 136 to another portion of the anchor webbing material adjacent the first end 136 by sewing, heat staking, ultrasonic welding, or any other suitable connection technique. The second end 138 can be coupled to an anchor latch 140. The anchor latch 140 is configured to be manually removably coupled and decoupled to a vehicle seat anchor by a user. The example first anchor webbing 134 can be made of polyester or another material.

The second anchor webbing 142 can have a first end 144 and a distal second end 146. The first end 144 can include a means for attaching the second anchor webbing 142 to the second webbing mounting post 120 on the spool or drum 114. In one example, the attachment means is a loop of the anchor webbing material provided at the first end 144 of the second anchor webbing 142 that can be slidably positioned onto the second web mounting post 120. The loop can be created by sewing an end portion of the second anchor webbing 142 onto an area of the webbing material adjacent the first end portion. The attachment means can alternatively include an eyelet, hollow tube, or adhesive coupled to or provided along the first end 144 of the second anchor webbing 142. The second end 146 can be coupled to an anchor latch 148. The anchor latch 148 is configured to be manually removably coupled and decoupled to a second vehicle seat anchor by a user. The second anchor webbing 142 can be made of polyester or another material.

While the example embodiment of FIGS. 1A-1E present a first anchor webbing 134 and a second anchor webbing 142, in other example embodiments, the booster seat base 100 can include a single anchor webbing disposed at least partially about the spool 114 and having a first end coupled to a first anchor latch 140 and a distal second end coupled to a second anchor latch 148. This alternative concept would allow for the elimination of one of the anchor webbings while still allowing for the slack on the first end and second end of the single anchor webbing to be taken up by the rotation of the spool 114.

In one example, the spool 114 can be spring-biased by the spring 150 to rotate in the direction D. When rotating in the direction D. the spool 114 will reel in any excess anchor webbing from the first anchor webbing 134 and the second anchor webbing 142 along the exterior of the side wall 116. Each of the web passageways 128, 132 can be sized and shaped so that at least a portion of the respective anchor latches 140, 148 will not pass through the respective web passageway 128, 132 and into the cavity of the booster seat base 100.

To install the booster seat onto a vehicle seat, a user can pull on one of the anchor latches 140, 148 with a force greater than the spring force of the spring 152 to cause the spool to rotate in the direction C to cause a reeled up portion of the anchor webbings 134, 142 to be unreeled from the spool 114. The web guide 126 will guide the first anchor webbing 134 along the path B and from a vertical orientation 160 to a horizontal orientation 162 and out of the cavity of the booster 100 through the web passageway 128. The web guide 130 will guide the second anchor webbing 142 along the path A and from a vertical orientation 164 to a horizontal orientation 166 and out of the cavity of the booster 100 through the web passageway 132. Each of the anchor latches 140, 148 can be removably coupled to respective vehicle seat anchors in the automobile. Once the booster 100 is coupled to the vehicle seat anchors and a force is no longer exerted on the anchor webbings 134, 142 by the user, the spring-biasing of the spring 152 on the spool 114 will cause the spool to rotate in the direction D and reel in any excess anchor webbing 134, 142 along the side wall 116 of the spool 114. The spool 114 will not lock (i.e. be prevented from rotating in either the direction C or D) in place either when the anchor webbings 134, 142 are connected to the vehicle seat anchors or when a sudden force (e.g., heaving vehicle braking or an accident involving the vehicle) intended to unreel the anchor webbings 134, 142 is applied to the booster seat base 100. Further, the spool does not include a mechanism for locking the spool rotationally in place or unlocking the spool to allow rotation.

When user wishes to decouple the booster seat base 100 from the vehicle seat anchors, the user can pull the booster seat base 100 away from the vehicle seat with a force greater than the spring-biasing force of the spring 152 on the spool 114. The movement of the booster seat base 100 while the anchor latches 140, 148 are attached to the vehicle seat anchors, will cause the spool 114 to rotate in the direction C to unreel the first anchor webbing 134 and second anchor webbing 142 and allow it to pass through the respective web passageways 128, 132. Once the anchor latches 140, 148 are decoupled from the vehicle seat anchors, the spring-biasing force of the spring 152 will cause the spool to rotate in the direction D to reel in the first anchor webbing 134 though the web passageway 128 and about the web guide 126 in the path opposite path B from a horizontal orientation 162 to a vertical orientation 160 and the second anchor webbing 142 through the web passageway 132 and about the web guide 130 in the path opposite path A from a horizontal orientation 166 to a vertical orientation 164 to be positioned along an outer surface of the side wall 116 of the spool 114.

Accordingly, as set forth herein, in one example embodiment, a child booster seat can be provided. The child booster seat can include a booster seat base, a spring-biased web spool coupled to and disposed within the booster seat base, wherein the spring-biased web spool is only rotatable with respect to the booster seat base, a first anchor webbing comprising a first end and a distal second end, the first end of the first anchor webbing coupled to the spring-biased web spool, a first anchor latch coupled to the second end of the first anchor webbing, a second anchor webbing comprising a first end and a distal second end, the first end of the second anchor webbing coupled to the spring-biased web spool; and a second anchor latch coupled to the second end of the second anchor webbing. Further, the child booster seat may be such that the spring-biased web spool is spring-biased to retract the first anchor webbing and the second anchor webbing onto the web spool. Further, the child booster seat may be such that the spring-biased web spool comprises a top surface and a side wall extending down from the top surface, wherein at least a portion of each of the first anchor webbing and the second anchor webbing is disposed along the side wall of the spring-biased web spool. The spring-biased web spool of the child booster seat may include a first web mounting post disposed along the side wall of the spring-biased web spool and a second web mounting post disposed along the side wall of the spring-biased web spool, wherein the first anchor webbing is coupled to the first web mounting post and the second anchor webbing is coupled to the second web mounting post. The side wall of the spring-biased web spool can have an annular shape, wherein the first web mounting post and the second web mounting post are positioned along diametrically opposite sides of the side wall. In addition, the first web mounting post can extend vertically up from the side wall, the second web mounting post can extend vertically up from the side wall, and each of the first web mounting post and the second web mounting post extends vertically above the top surface of the spring-biased web spool. The child booster seat can also include a spring comprising a first end contacting or coupled to the booster seat base and a second end contacting or coupled to the spring-biased web spool. In certain examples, the spring is one of a torsion spring, a compression spring, and a tension spring. Further, in certain embodiments the spring-biased web spool does not include a locking mechanism configured to prevent the spring-biased web spool from rotating and configured to hold the first anchor webbing and the second anchor webbing in place with respect to the booster seat base. Still further, in certain embodiments, the spring-biased web spool further does not include a release mechanism configured to release the spring-biased web spool from a locked configuration and allow the spring-biased web spool to rotate with respect to the booster seat base. The child booster seat can also include a seat back coupled to the booster seat base. In certain examples, the seat back is rotatable or foldable with respect to the seat base. In certain examples, the booster seat base can include a first curved web guide configured to guide the first anchor webbing, a second curved web guide configured to guide the second anchor webbing, a mounting post, and a spring mounting to the mounting post, wherein the spring-biased web spool is movably coupled to the mounting post and coupled to a portion of the spring, wherein the spring provides a spring-biasing force on the spring-biased web spool. The booster seat base can also include a first web passageway configured to receive a portion of the first anchor webbing therethrough, the first web passageway providing a first passageway from an internal cavity of the booster seat base to an exterior of the booster seat base and a second web passageway configured to receive a portion of the second anchor webbing therethrough, the second web passageway providing a second passageway from the internal cavity to the exterior of the booster seat base.

In another example embodiment, a child safety seat can be provided. The child safety seat can include a booster seat base, an automatically retracting web spool coupled to the booster seat base, a first anchor webbing comprising a first end and a distal second end, the first end of the first anchor webbing coupled to the automatically retracting web spool, a first anchor latch coupled to the second end of the first anchor webbing, a second anchor webbing comprising a first end and a distal second end, the first end of the second anchor webbing coupled to the automatically retracting web spool, and a second anchor latch coupled to the second end of the second anchor webbing, wherein the automatically retracting web spool does not include a locking mechanism configured to prevent the spring-biased web spool from rotating and configured to hold the first anchor webbing and the second anchor webbing in place with respect to the automatically retracting web spool. In certain examples, the booster seat base can include a top panel coupled to an opposing bottom panel, wherein the top panel and the bottom panel define a cavity within the booster seat base, and the automatically retracting web spool can be disposed along the bottom panel and within the cavity of the booster seat base. In certain examples, the automatically retracting web spool also does not include a release mechanism configured to release the automatically retracting web spool from a locked configuration and allow the automatically retracting web spool to rotate with respect to the booster seat base. In certain embodiments, the child safety seat can also include a spring comprising a first end coupled to the bottom panel and a second end coupled to the automatically retracting web spool, wherein the spring spring-biases the automatically retracting web spool to rotate and automatically retract the first anchor webbing and the second anchor webbing. The bottom panel can include, for example, a first curved web guide configured to guide the first anchor webbing, a second curved web guide configured to guide the second anchor webbing, a mounting post, a first web passageway configured to receive a portion of the first anchor webbing therethrough, the first web passageway providing a first passageway from the cavity to an exterior of the booster seat base, and a second web passageway configured to receive a portion of the second anchor webbing therethrough, the second web passageway providing a second passageway from the cavity to an exterior of the booster seat base, wherein the spring is mounted to the mounting post and wherein the automatically retracting web spool is movably coupled to the mounting post. In certain examples, the automatically retracting web spool does not move forward, backward, or side-to-side within cavity.

In another example embodiment, a child booster seat can be provided. The child booster seat can include a booster seat base, a spring-biased web spool coupled to the booster seat base, wherein the spring-biased web spool is only rotatable with respect to the booster seat base, a first anchor webbing comprising a first end and a distal second end, a first anchor latch coupled to the first end of the first anchor webbing, and a second anchor latch coupled to the second end of the first anchor webbing.

While the above description contains many specifics, these specifics should not be construed as limitations on the scope of the disclosure, but merely as examples of the disclosed embodiments. Those skilled in the art will envision many other possible variations that are within the scope of the disclosure.

Additionally, although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, and/or steps. Thus, such conditional language is not generally intended to imply that features, elements, and/or steps are in any way required for one or more embodiments.

What is claimed is:

1. A child booster seat comprising:
    a booster seat base;
    a spring-biased web spool coupled to and disposed within the booster seat base, wherein the spring-biased web spool is only rotatable with respect to the booster seat base and does not include a locking mechanism configured to prevent the spring-biased web spool from rotating;
    a first anchor webbing comprising a first end and a distal second end, the first end of the first anchor webbing coupled to the spring-biased web spool;
    a first anchor latch coupled to the second end of the first anchor webbing;
    a second anchor webbing comprising a first end and a distal second end, the first end of the second anchor webbing coupled to the spring-biased web spool; and
    a second anchor latch coupled to the second end of the second anchor webbing.

2. The child booster seat of claim 1, wherein the spring-biased web spool is spring-biased to retract the first anchor webbing and the second anchor webbing onto the web spool.

3. The child booster seat of claim 2, wherein the spring-biased web spool comprises a top surface and a side wall extending down from the top surface, wherein at least a portion of each of the first anchor webbing and the second anchor webbing is disposed along the side wall of the spring-biased web spool.

4. The child booster seat of claim 3, wherein spring-biased web spool further comprises:
    a first web mounting post disposed along the side wall of the spring-biased web spool; and
    a second web mounting post disposed along the side wall of the spring-biased web spool,
    wherein the first anchor webbing is coupled to the first web mounting post and the second anchor webbing is coupled to the second web mounting post.

5. The child booster seat of claim 4, wherein the side wall has an annular shape, and wherein the first web mounting post and the second web mounting post are positioned along diametrically opposite sides of the side wall.

6. The child booster seat of claim 4, wherein the first web mounting post extends vertically up from the side wall, wherein the second web mounting post extends vertically up from the side wall, and wherein each of the first web mounting post and the second web mounting post extends vertically above the top surface of the spring-biased web spool.

7. The child booster seat of claim 2, further comprising a spring comprising a first end contacting the booster seat base and a second end contacting the spring-biased web spool.

8. The child booster seat of claim 7, wherein the spring is one of a torsion spring, a compression spring, and a tension spring.

9. The child booster seat of claim 1, wherein the spring-biased web spool further does not include a release mechanism configured to release the spring-biased web spool from a locked configuration and allow the spring-biased web spool to rotate with respect to the booster seat base.

10. The child booster seat of claim 1, further comprising a seat back coupled to the booster seat base.

11. The child booster seat of claim 1, wherein the booster seat base further comprises:
    a first curved web guide configured to guide the first anchor webbing;
    a second curved web guide configured to guide the second anchor webbing;
    a mounting post; and
    a spring mounting to the mounting post;
    wherein the spring-biased web spool is movably coupled to the mounting post and coupled to a portion of the spring, wherein the spring provides a spring-biasing force on the spring-biased web spool.

12. The child booster seat of claim 11, wherein the booster seat base further comprises:

a first web passageway configured to receive a portion of the first anchor webbing therethrough, the first web passageway providing a first passageway from an internal cavity of the booster seat base to an exterior of the booster seat base; and a second web passageway configured to receive a portion of the second anchor webbing therethrough, the second web passageway providing a second passageway from the internal cavity to the exterior of the booster seat base.

13. A child safety seat comprising:
a booster seat base;
an automatically retracting web spool coupled to the booster seat base;
a first anchor webbing comprising a first end and a distal second end, the first end of the first anchor webbing coupled to the automatically retracting web spool;
a first anchor latch coupled to the second end of the first anchor webbing;
a second anchor webbing comprising a first end and a distal second end, the first end of the second anchor webbing coupled to the automatically retracting web spool; and
a second anchor latch coupled to the second end of the second anchor webbing;
wherein the automatically retracting web spool does not include a locking mechanism configured to prevent the spring-biased web spool from rotating and configured to hold the first anchor webbing and the second anchor webbing in place with respect to the automatically retracting web spool.

14. The child safety seat of claim 13, wherein the booster seat base comprises a top panel coupled to an opposing bottom panel, wherein the top panel and the bottom panel define a cavity within the booster seat base; and
wherein the automatically retracting web spool is disposed along the bottom panel and within the cavity of the booster seat base.

15. The child safety seat of claim 13, wherein the automatically retracting web spool further does not include a release mechanism configured to release the automatically retracting web spool from a locked configuration and allow the automatically retracting web spool to rotate with respect to the booster seat base.

16. The child safety seat of claim 13, further comprising a spring comprising a first end coupled to the bottom panel and a second end coupled to the automatically retracting web spool, wherein the spring spring-biases the automatically retracting web spool to rotate and automatically retract the first anchor webbing and the second anchor webbing.

17. The child safety seat of claim 16, wherein the bottom panel further comprises:
a first curved web guide configured to guide the first anchor webbing;
a second curved web guide configured to guide the second anchor webbing;
a mounting post;
a first web passageway configured to receive a portion of the first anchor webbing therethrough, the first web passageway providing a first passageway from the cavity to an exterior of the booster seat base; and
a second web passageway configured to receive a portion of the second anchor webbing therethrough, the second web passageway providing a second passageway from the cavity to an exterior of the booster seat base;
wherein the spring is mounted to the mounting post; and
wherein the automatically retracting web spool is movably coupled to the mounting post.

18. The child safety seat of claim 13, wherein the automatically retracting web spool does not move forward, backward, or side-to-side within cavity.

19. A child booster seat comprising:
a booster seat base;
a spring-biased web spool coupled to the booster seat base, wherein the spring-biased web spool is only rotatable with respect to the booster seat base;
a first anchor webbing comprising a first end and a distal second end;
a first anchor latch coupled to the first end of the first anchor webbing; and
a second anchor latch coupled to the second end of the first anchor webbing,
wherein the spring-biased web spool does not include a locking mechanism configured to prevent the spring-biased web spool from rotating and configured to hold the first anchor webbing and the second anchor webbing in place with respect to the spring-biased web spool.

* * * * *